(12) United States Patent
Walz et al.

(10) Patent No.: US 10,584,732 B2
(45) Date of Patent: Mar. 10, 2020

(54) CONNECTING EXPANSION BOLTS OVER-MOLDED WITH EXPANSION SLEEVES

(71) Applicant: Häfele Berlin GmbH & Co KG, Berlin (DE)

(72) Inventors: Rüdiger Walz, Neustetten (DE); Michael Von Wilcke, Birkenwerder (DE)

(73) Assignee: HÄFELE BERLIN GMBH & CO KG, Berlin (DE)

( * ) Notice: Subject to any disclaimer, the term of this patent is extended or adjusted under 35 U.S.C. 154(b) by 187 days.

(21) Appl. No.: 15/925,213

(22) Filed: Mar. 19, 2018

(65) Prior Publication Data
US 2018/0209461 A1    Jul. 26, 2018

Related U.S. Application Data

(63) Continuation of application No. PCT/EP2016/064969, filed on Jun. 28, 2016.

(30) Foreign Application Priority Data

Sep. 23, 2015 (DE) .................... 20 2015 105 030 U

(51) Int. Cl.
*F16B 13/06* (2006.01)
*F16B 13/08* (2006.01)

(52) U.S. Cl.
CPC ........ *F16B 13/068* (2013.01); *F16B 13/0858* (2013.01); *A47B 2230/0033* (2013.01); *F16B 13/06* (2013.01)

(58) Field of Classification Search
CPC ...... F16B 13/004; F16B 13/06; F16B 13/065; F16B 13/066; F16B 13/068;
(Continued)

(56) References Cited

U.S. PATENT DOCUMENTS 1,549,327 A * 8/1925 Pleister ................. F16B 13/068
411/28
1,603,611 A * 10/1926 Kottusch ................. F02F 3/025
92/205
(Continued)

FOREIGN PATENT DOCUMENTS

CN     2116116 U    9/1992
CN     2649847 Y   10/2004
(Continued)

*Primary Examiner* — Roberta S Delisle
(74) *Attorney, Agent, or Firm* — Hackler Daghighian Martino & Novak

(57) ABSTRACT

A connecting expansion bolt over-molded with an expansion sleeve includes a bolt head at one bolt end and a bolt cone tapering in the direction of the bolt head. At the other bolt end, the bolt cone and an adjoining bolt shaft portion are over-molded with a plastic expansion sleeve, the sleeve end of which that surrounds the bolt cone is divided into a plurality of spreadable sleeve segments by open-ended slits. Provision is made for the sleeve end that surrounds the bolt cone to be divided into at least three sleeve segments. For at least two of the slits on the bolt cone that separate the sleeve segments from one another do not extend parallel to the bolt axis.

11 Claims, 2 Drawing Sheets

(58) Field of Classification Search
CPC .. F16B 13/0858; F16B 13/122; F16B 13/124;
F16B 13/126; F16B 13/128; F16B
19/1081; F16B 19/109; A47B 2230/0033
USPC .......................... 411/32, 44, 80.1–80.2, 80.5
See application file for complete search history.

(56) References Cited

U.S. PATENT DOCUMENTS

| | | | | |
|---|---|---|---|---|
| 3,283,640 | A | * | 11/1966 | Ono ...................... F16B 13/068 411/33 |
| 3,512,448 | A | * | 5/1970 | Jeal ...................... F16B 13/063 411/53 |
| 4,334,813 | A | * | 6/1982 | Oettl .................... F16B 13/065 411/68 |
| 4,893,973 | A | * | 1/1990 | Herb ..................... F16B 13/122 411/55 |
| 5,716,177 | A | * | 2/1998 | Schaffer ................ F16B 13/065 411/60.3 |
| 7,083,370 | B2 | | 8/2006 | Vallance |
| 7,682,116 | B2 | | 3/2010 | Cabrele et al. |
| 8,192,122 | B2 | * | 6/2012 | Gaudron ............... F16B 13/066 411/32 |
| 2001/0010787 | A1 | | 8/2001 | Hsu |
| 2011/0081217 | A1 | | 4/2011 | Wissling et al. |

FOREIGN PATENT DOCUMENTS

| | | |
|---|---|---|
| CN | 102032252 A | 4/2011 |
| CN | 203614539 U | 5/2014 |
| DE | 3146518 A1 | 6/1983 |
| DE | 10 2004 010 727 A1 | 9/2005 |
| DE | 60218621 T2 | 11/2007 |
| EP | 0666426 A1 | 8/1995 |
| EP | 0940587 A2 | 9/1999 |
| EP | 1323934 A2 | 7/2003 |
| EP | 1 887 230 A2 | 2/2008 |
| EP | 1982818 A1 | 10/2008 |
| GB | 2 245 326 B | 1/1992 |
| JP | 2003 194023 A | 7/2003 |
| RU | 2117190 C1 | 8/1998 |
| RU | 2550489 C2 | 5/2015 |

* cited by examiner

CONNECTING EXPANSION BOLTS OVER-MOLDED WITH EXPANSION SLEEVES

CROSS-REFERENCE TO RELATED APPLICATIONS

This continuation application claims priority to PCT/EP2016/064969 filed on Jun. 28, 2016 which has published as WO 2017/050446 A1, and also the German application number 20 2015 105 030.5 filed on Sep. 23, 2015, the entire contents of which are fully incorporated herein with these references.

DESCRIPTION

Field of Invention

The invention relates to a connecting expansion bolt over-molded with an expansion sleeve, comprising a bolt head at one bolt end and a bolt cone, tapering in the direction of the bolt head, at the other bolt end, wherein the bolt cone and an adjoining bolt shaft portion are over-molded with a plastic expansion sleeve, the sleeve end of which that surrounds the bolt cone is divided into a plurality of expandable sleeve segments by open-ended slits.

Background of the Invention

Such connecting expansion bolts over-molded with an expansion sleeve are known and are used for example at a corner connection of two wood fiberboards. In the known connecting expansion bolts over-molded with an expansion sleeve, the sleeve end that surrounds the bolt cone is divided into two expandable sleeve segments by two open-ended slits. The two slits extend parallel to the bolt axis along their entire length, i.e. including on the bolt cone. Since the two sleeve segments expand only in two directions when the connection is tightened, the retaining force when the corner connection is under tensile load is not optimal.

Although a connecting expansion bolt over-molded with an expansion sleeve in which the expandable sleeve end is divided into three or four sleeve segments by axially parallel slits is possible in principle, it is only possible with much greater effort, since, for this purpose, an injection-molding tool with a slide is required.

Folding plastic expansion sleeves with three or four sleeve segments are also known, but are manufactured separately and subsequently closed ("clip-fastened") manually around the metal bolt in a time-consuming manner.

With regard to production and cost-effectiveness, connecting expansion bolts over-molded with an expansion sleeve, having two sleeve segments, are mainly produced nowadays with slide-free injection-molding tools.

The object of the present invention is to develop a connecting expansion bolt over-molded with an expansion sleeve of the type mentioned at the beginning such that greater retention of the connecting expansion bolt in the bore of a wood fiberboard under tensile load can be achieved and the connecting expansion bolt over-molded with an expansion sleeve can be produced with slide-free injection-molding tools.

SUMMARY OF THE INVENTION

This object is achieved according to the invention in that the sleeve end that surrounds the bolt cone is divided into at least three sleeve segments, and in that at least two of the slits that separate the sleeve segments from one another do not extend parallel to the bolt axis on the bolt cone.

On account of its at least three sleeve segments, the connecting expansion bolt over-molded with an expansion sleeve according to the invention achieves greater retention and a more uniform force distribution in the bore of the wood fiberboard under tensile load, and greater angular stability, and allows correspondingly greater pull-out forces. Since the slits on the bolt cone do not extend parallel to the bolt axis but in an inclined manner, cost-effective production with a slide-free injection-molding tool is possible.

Preferably, the sleeve end that surrounds the bolt cone is divided into three or four sleeve segments. The greater the number of expandable sleeve segments, the greater the retention and angular stability and the more uniform the force distribution in the bore of the wood fiberboard under tensile load.

In a preferred embodiment of the invention, the bolt cone is configured as a single cone, wherein the slits on the single cone have a slit portion that is inclined with respect to the bolt axis.

In a preferred alternative embodiment of the invention, the bolt cone is configured as a double cone, wherein the slits on each cone of the double cone have a slit portion that is inclined with respect to the bolt axis, and the two inclined slit portions of a slit extend in an offset manner parallel to one another. The double cone effects spreading of the sleeve segments along a greater length than in the case of a single cone, this resulting in a greater retaining force.

The over-molded bolt may, according to the invention, be a metal bolt, for example made of die-cast zinc or steel, or a plastics bolt. However, other over-moldable materials are also possible.

Further advantages of the invention can be gathered from the description, the claims and the drawing. Likewise, the abovementioned features and those that are set out below can each be implemented individually or jointly in any desired combinations. The embodiments that are shown and described should not be understood as being a definitive list but rather as examples for outlining the invention.

DETAILED DESCRIPTION OF THE PREFERRED EMBODIMENTS

In the following description of the figures, identical reference signs are used for identical or functionally identical components.

Figure 1:
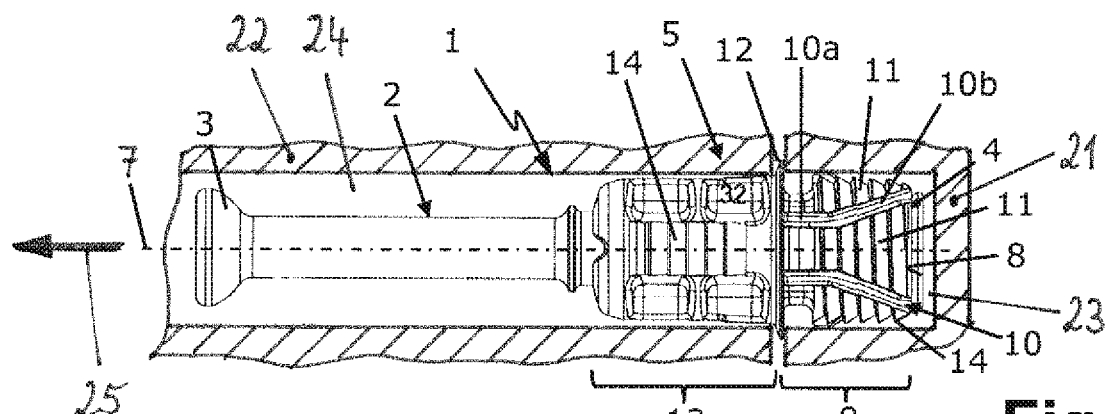
FIG. 1 shows a connecting expansion bolt over-molded with an expansion sleeve according to the invention, having four sleeve segments and a single cone for spreading the sleeve segments.

The four-leaf connecting expansion bolt 1 over-molded with an expansion sleeve that is shown in FIG. 1 serves to form a corner connection of two wood fiberboards 21, 22.

Figure 2:
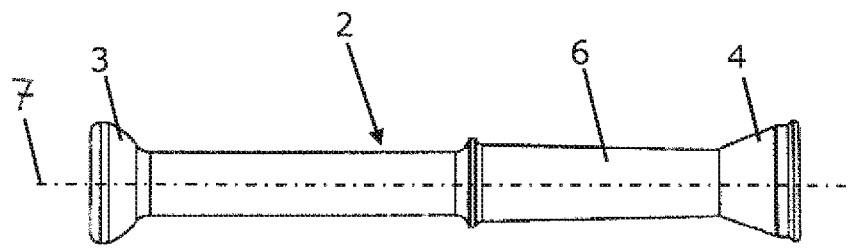
FIG. 2 shows the connecting expansion bolt shown in FIG. 1, without the expansion sleeve.
Figure 3:
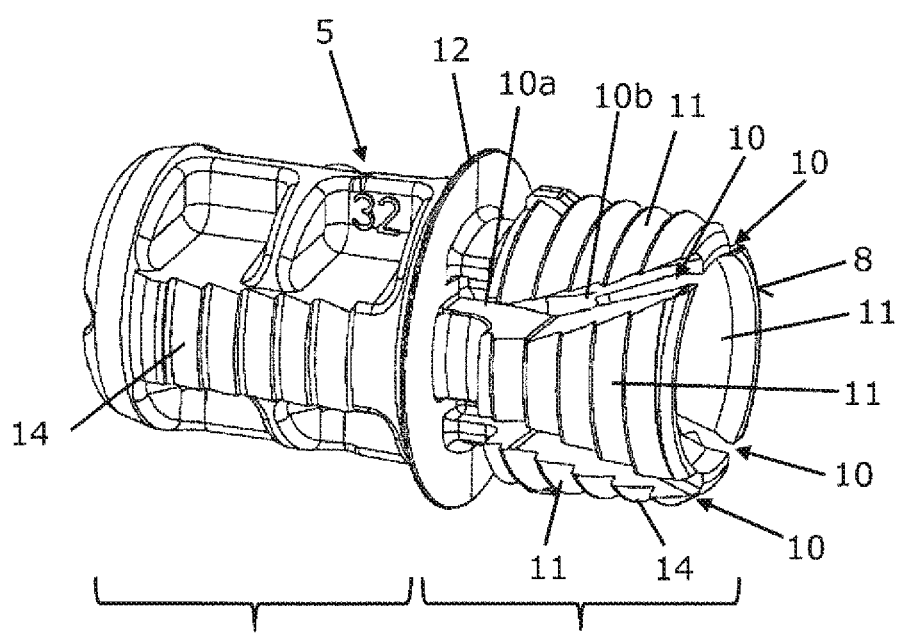
FIG. 3 shows the expansion sleeve shown in FIG. 1.

The connecting expansion bolt 1 over-molded with an expansion sleeve comprises a metal or plastic bolt 2 (FIG. 2), having a bolt head 3 at one bolt end and having a bolt cone 4 in the form of a single cone, tapering in the direction of the bolt head 3, at the other bolt end, and a sleeve-like plastic expansion sleeve 5 (FIG. 3). The bolt cone 4 and an adjoining bolt shaft portion 6 are over-molded with the expansion sleeve 5, wherein the bolt cone 4 protrudes with its outermost end beyond the sleeve end side 8 of the expansion sleeve 5.

The one sleeve end 9, surrounding the bolt cone 4, of the expansion sleeve 5 is divided by four open-ended slits 10 into four expandable sleeve segments 11. The slits 10 are open toward the sleeve end side 8 of the expansion sleeve 5 and extend as far as an annular depth stop 12 of the expansion sleeve 5, said depth stop 12 protruding radially outward and separating the spreadable sleeve end 9 from the other sleeve end 13.

Proceeding from the depth stop 12, the slits 10 on the bolt shaft portion 6 each have an axially parallel slit portion 10a, which extends straight and parallel to the bolt axis 7, and, on the bolt cone 4, an inclined slit portion 10b, which extends straight but not parallel to the bolt axis 7 and is angled through about 20° with respect to the axially parallel slit portion 10a. In the exemplary embodiment shown, the inclined slit portion 10b is approximately twice as long as the axially parallel slit portion 10a. The inclined slit portions 10b of the two slits 10 that are visible in FIG. 1 are angled away from one another. Analogously, the inclined slit portions 10b of the two slits 10 that are not visible in FIG. 1 are likewise angled away from one another.

In the exemplary embodiment shown, the two sleeve ends 9, 13 each have on their outer sides a plurality of ribs 14 arranged axially one after another, which are each provided all around the spreadable sleeve end 9 (for example as screw threads) and are provided only on two mutually opposite sides on the other sleeve end 13.

As shown in FIG. 1, the spreadable sleeve end 9 is plugged into a blind bore 23 in the one, first board 21 and the other sleeve end 13 is plugged into a bore 24 in the other, second board 22, wherein the respective insertion depths are limited by the depth stop 12. Subsequently, the bolt head 3 is pulled in the arrow direction 25 by means of a tightening element (not shown) anchored in the second board 22 and as a result displaced relative to the expansion sleeve 5, which bears against the first board 21 via its depth stop 12 so as not to be displaceable in the pulling direction 25. The relative movement of the bolt cone 4 with respect to the expansion sleeve 5 causes the sleeve segments 11 to spread radially outward, which are impressed into the wall of the blind bore 23, i.e. into the wood material of the first board 21, with their ribs 14. When the depth stop 12 has been pressed fully into the boards 21, 22 and the boards 21, 22 bear against one another, the tightening operation is ended.

Rather than with four sleeve segments 11, the connecting expansion bolt 1 over-molded with an expansion sleeve and having a single cone 4 that is shown in FIG. 1 can also be embodied with only three or with more sleeve segments. In the case of an odd number of sleeve segments, one of the slits can alternatively also extend straight and parallel to the bolt axis 7 along its entire length, i.e. from the depth stop 12 to the end side 8.

Figure 4:
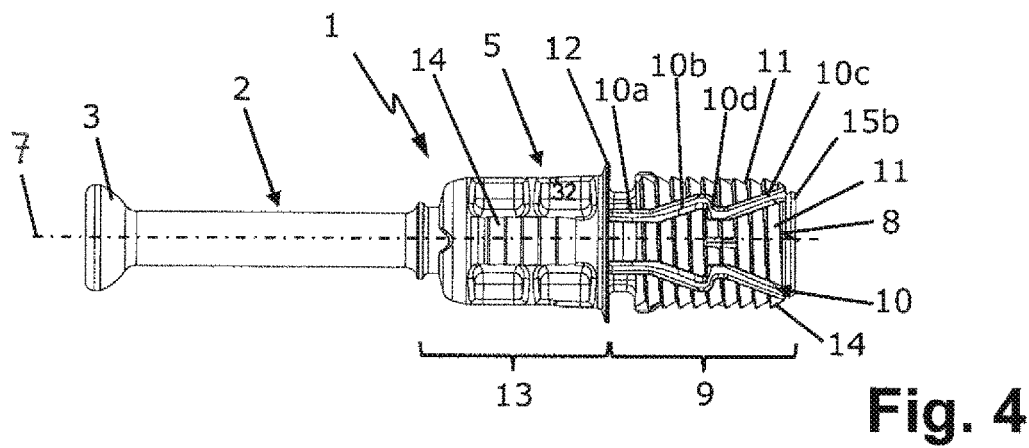
FIG. 4 shows a connecting expansion bolt over-molded with an expansion sleeve according to the invention, having four sleeve segments and a double cone for spreading the sleeve segments.
Figure 5:
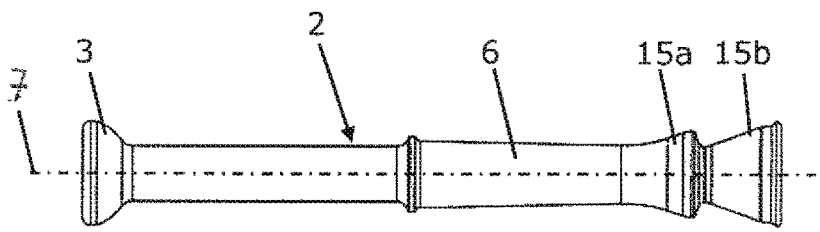
FIG. 5 shows the connecting expansion bolt shown in FIG. 4, without the expansion sleeve.
Figure 6:
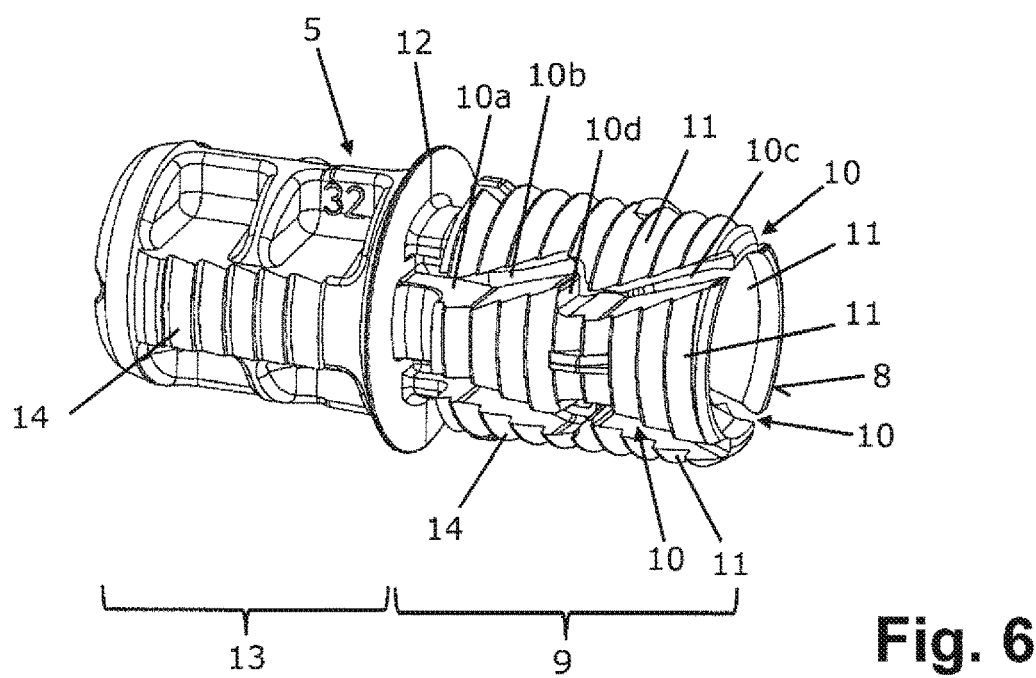
FIG. 6 shows the expansion sleeve shown in FIG. 4.

The four-leaf connecting expansion bolt 1 shown in FIG. 4 differs from the connecting expansion bolt shown in FIG. 1 in that, in this case, the bolt cone is configured as a double cone 15a, 15b and the spreadable sleeve end 9 is embodied in a longer manner and is divided into four sleeve segments 11 by four zigzag slits 10. Proceeding from the depth stop 12, the slits 10 each have on the bolt shaft portion 6 an axially parallel slit portion 10a, which extends straight and parallel to the bolt axis 7, on the inner cone 15a a first inclined slit portion 10b, which extends straight but not parallel to the bolt axis 7 and is angled through about 20° with respect to the axially parallel slit portion 10a, and on the outer cone 15b a second inclined slit portion 10c, which is set back with respect to the first inclined slit portion 10b by a transversely extending slit portion 10d and extends parallel to the first inclined slit portion 10b. The transversely extending slit portion 10d is angled in each case through about 90° with respect to the two inclined slit portions 10b, 10c. The inclined slit portions 10b, 10c of the two slits 10 that are visible in FIG. 4 are angled away from one another. Analogously, the inclined slit portions 10b, 10c of the two slits 10 that are not visible in FIG. 4 are likewise angled away from one another.

In the installed state, the tightening of the bolt head 3 brings about a relative movement of the double cone 15a, 15b with respect to the expansion sleeve 5 and, as a result, in each case twofold spreading of the sleeve segments 11 radially outward, which are impressed into the wall of the blind bore 23, i.e. into the wood material of the first board 21, with their ribs 14.

The connecting expansion bolt 1 having four sleeve segments 11 and a double cone 15a, 15b that is shown in FIG. 4 displays, on account of the greater length of the sleeve segments 11, a greater retaining force than the connecting expansion bolt 1 with a single cone 4 that is shown in FIG. 1.

Rather than with four sleeve segments 11, the connecting expansion bolt 1 over-molded with an expansion sleeve and having a double cone 15a, 15b that is shown in FIG. 4 can also be embodied with only three or with more sleeve segments. In the case of an odd number of sleeve segments, one of the slits can alternatively also extend straight and parallel to the bolt axis 7 along its entire length, i.e. from the depth stop 12 to the end side 8.

What is claimed is:

1. A connecting expansion bolt over-molded with an expansion sleeve, comprising:
   a bolt head at one bolt end extending along a bolt axis to a bolt cone at the other bolt end, the bolt cone tapering in the direction of the bolt head;
   wherein the bolt cone and an adjoining bolt shaft portion are over-molded with a plastic expansion sleeve;
   wherein a sleeve end of the plastic expansion sleeve surrounds the bolt cone and is divided into a plurality of spreadable sleeve segments by open-ended slits;
   wherein the plurality of spreadable sleeve segments comprises at least three spreadable sleeve segments; and
   wherein at least two of the open-ended slits that separate the plurality of spreadable sleeve segments from one another do not extend parallel to the bolt axis on the bolt cone.

2. The connecting expansion bolt over-molded with the expansion sleeve as claimed in claim 1, wherein the sleeve end that surrounds the bolt cone is divided into three spreadable sleeve segments.

3. The connecting expansion bolt over-molded with the expansion sleeve as claimed in claim 1, wherein the sleeve end that surrounds the bolt cone is divided into four spreadable sleeve segments.

4. The connecting expansion bolt over-molded with the expansion sleeve as claimed in claim 1, wherein none of the open-ended slits on the bolt cone extend parallel to the bolt axis.

5. The connecting expansion bolt over-molded with the expansion sleeve as claimed in claim 1, wherein the bolt cone is configured as a single cone.

6. The connecting expansion bolt over-molded with the expansion sleeve as claimed in claim 5, wherein the open-ended slits on the single cone have a slit portion that is inclined with respect to the bolt axis.

7. The connecting expansion bolt over-molded with the expansion sleeve as claimed in claim 1, wherein the bolt cone is configured as a double cone.

8. The connecting expansion bolt over-molded with the expansion sleeve as claimed in claim 7, wherein the open-ended slits on each cone of the double cone have a slit portion that is inclined with respect to the bolt axis, and the two inclined slit portions of an open-ended slit extend in an offset manner parallel to one another.

9. The connecting expansion bolt over-molded with the expansion sleeve as claimed in claim 1, wherein the open-ended slits on the bolt shaft portion have an axially parallel slit portion with respect to the bolt axis.

10. The connecting expansion bolt over-molded with the expansion sleeve as claimed in claim 1, wherein the open-ended slits extend from a sleeve end side to a depth stop of the expansion sleeve.

11. The connecting expansion bolt over-molded with the expansion sleeve as claimed in claim 1, wherein the connecting expansion bolt is a metal bolt or a plastic bolt.

* * * * *